United States Patent [19]

Hyvärinen

[11] Patent Number: 5,548,479

[45] Date of Patent: Aug. 20, 1996

[54] DEVICE FOR PROTECTING A MEMORY OR MICROCIRCUIT UNIT

[75] Inventor: Jukka Hyvärinen, Espoo, Finland

[73] Assignee: ICL Personal Systems OY, Helsinki, Finland

[21] Appl. No.: 295,932

[22] Filed: Aug. 25, 1994

[30] Foreign Application Priority Data

Sep. 2, 1993 [FI] Finland .................. 933846

[51] Int. Cl.$^6$ .................. H05K 7/14; H05K 5/00
[52] U.S. Cl. .................. 361/684; 361/726; 361/754; 439/159; 439/144; 70/58; 70/159
[58] Field of Search .................. 361/726, 740, 361/747, 754, 755, 759, 737, 727, 798, 801, 684, 685; 439/159, 160, 152, 133, 304, 142, 144; 70/58, 159

[56] References Cited

U.S. PATENT DOCUMENTS

| | | | |
|---|---|---|---|
| 4,547,835 | 10/1985 | Pansaerts et al. | 361/399 |
| 4,926,286 | 5/1990 | Maki et al. | 361/726 |
| 4,964,285 | 10/1990 | Lakoski et al. | 70/14 |
| 4,975,805 | 12/1990 | Schmutzler | 361/399 |
| 5,117,661 | 6/1992 | Carl et al. | 70/58 |
| 5,146,769 | 9/1992 | Smith | 70/58 |
| 5,305,621 | 4/1994 | Broadwater | 70/58 |
| 5,355,272 | 10/1994 | Kung | 70/58 |
| 5,363,281 | 11/1994 | Baitz et al. | 361/740 |
| 5,377,512 | 1/1995 | Kelley | 70/58 |
| 5,400,622 | 3/1995 | Harmon | 70/58 |
| 5,446,618 | 8/1995 | Tetsuya et al. | 361/683 |

FOREIGN PATENT DOCUMENTS

| | | | |
|---|---|---|---|
| 3702821A1 | 8/1988 | Germany | G06F 12/14 |
| 3828500A1 | 3/1990 | Germany | G11B 33/02 |
| WO93/12524 | 6/1993 | WIPO | G11B 33/00 |

Primary Examiner—Leo P. Picard
Assistant Examiner—Lynn D. Hendrickson
Attorney, Agent, or Firm—Fitch, Even, Tabin & Flannery

[57] ABSTRACT

The invention relates to a device for protecting a memory or microcircuit unit, such as a PCMCIA card. The device comprises a mounting place receiving the memory or microcircuit unit and a protective lid. The lid pivotably attached to a locking mechanism of the protective device, operated by a removable key, is turned to protect the memory or microcircuit unit positioned in its place, when the key is turned to an ON position in the protective device.

7 Claims, 2 Drawing Sheets

DEVICE FOR PROTECTING A MEMORY OR MICROCIRCUIT UNIT

BACKGROUND OF THE INVENTION

The present invention relates to a device for protecting a memory or microcircuit unit, the device comprising a mounting place receiving the memory or microcircuit unit and a protective lid.

It is previously known to provide the memory or diskette unit of PCs, for instance, with a lid acting as dust cover, as described in the Finnish publication 85096, for example. In new, so-called PCMCIA stations, no protective lid whatsoever is used, but an electric memory card is slipped into an open mounting aperture, from which it is removed by pressing a release button. However, considerable drawbacks are associated with this known technique. So, an equipment having a memory card station with the mounting aperture not protected by a lid of any kind gets dusty inside, due to which the equipment is heated and disturbances or errors occur in the operation. On the other hand, a misuse of memory or microcircuit units, i.e. illegal entry into possession, stealing, could not be prevented by using a dust cover for protecting the diskette station of equipments.

SUMMARY OF THE INVENTION

The object of the present invention is to eliminate the drawbacks of the known technique and to provide a quite novel solution, in which the memory or microcircuit unit is protected by means of a lockable lid, which prevents a removal of the unit from the drive.

The invention is based on the idea that it must be possible to protect a memory or microcircuit unit containing big amounts of data, software or operative microcircuits etc. against thefts, for instance. Then a memory or microcircuit unit positioned (hidden) behind a lid, for example, is not likely to provoke into stealing just as easily. A space which is locked also prevents efficiently stealing on an impulse.

To put it more accurately, the device according to the invention is mainly characterized in that the lid pivotably attached to a locking mechanism of the protective device, operated by a removable key, turns to protect the memory or microcircuit unit positioned in its place, when the key of the protective device is turned to an ON position. The release button of the memory or microcircuit unit may also be placed so as to be protected behind the lid when this turns shut.

In a first preferred embodiment of the protective device constituting the object of the invention, a cylinder provided with a groove is rigidly connected to the locking mechanism. A guide pin is arranged in the groove to move a sliding mechanism, which comprises a mounting carriage receiving the memory or microcircuit unit to facilitate the mounting of the unit.

The sliding mechanism, controlled by the cylinder rigidly connected to the locking mechanism and provided with a groove and moved by the guide pin arranged in the groove, is provided with guiding means communicating with guiding arms of the protective lid for opening and closing the lid.

With the key of the protective device turned to an OFF position in the locking mechanism, the sliding mechanism with its mounting carriage slides out by means of the guide pin and pushes with its guiding means the guiding arms of the protective lid and opens the lid, whereby the mounting carriage is ready to receive a new memory or microcircuit unit or to deliver the one which has been in use. With the key turned to the ON position, the guiding means close the lid by pulling at the guiding arms and the guide pin pulls the mounting carriage into the device and takes the memory or microcircuit unit to its place.

When the key is removed from the lock, with the lid in the protective position and the mounting carriage within the device, the memory or microcircuit unit cannot be removed from its mounting place without violence.

Alternatively, the protective device may be mounted fixedly to an apparatus or a machine using it or it may be mounted to an adapter, by which it is attached to a free mounting place of the apparatus or machine using it.

Considerable advantages are achieved by means of the invention. Accordingly, a protected storage unit decreases the risks of theft. The inside of the equipment is protected from dust, which improves the operational safety. Additionally, the device may be mounted on a mounting place already existing in the using equipment, in a so-called 5¼" slot, without subjecting the equipment to any specific changes.

BRIEF DESCRIPTION OF THE DRAWINGS

In the following, the invention will be examined in greater detail by means of the attached drawings, in which.

DESCRIPTION

Figure 1:
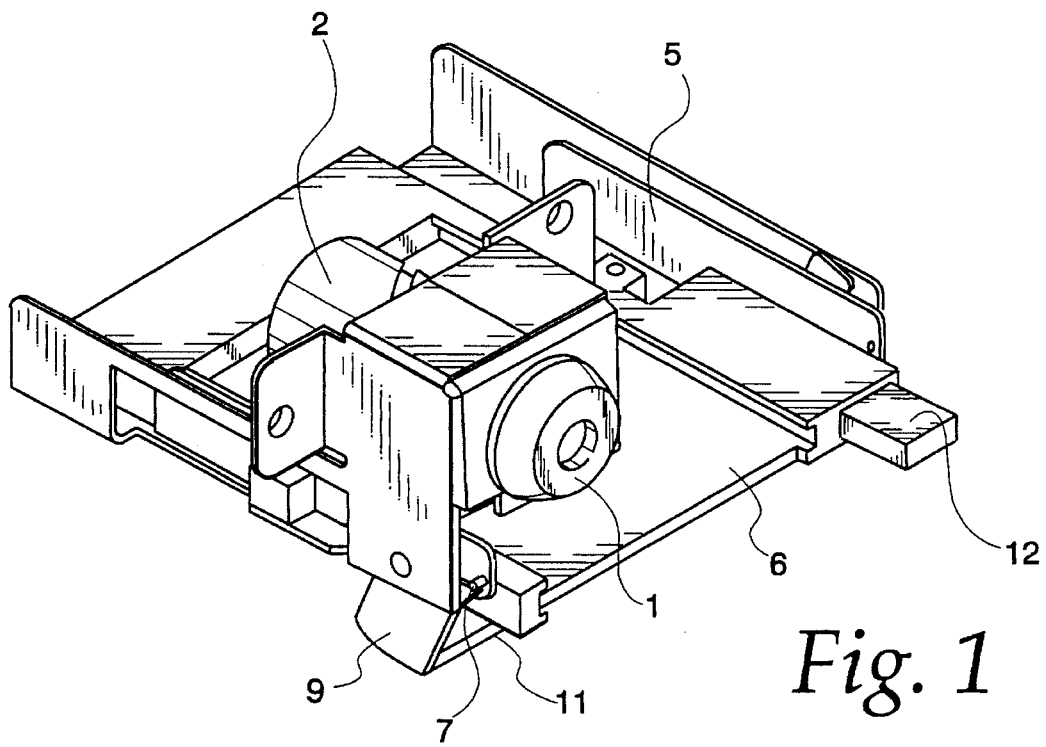
FIG. 1 shows a perspective front view of a device in an OFF position.
Figure 2:
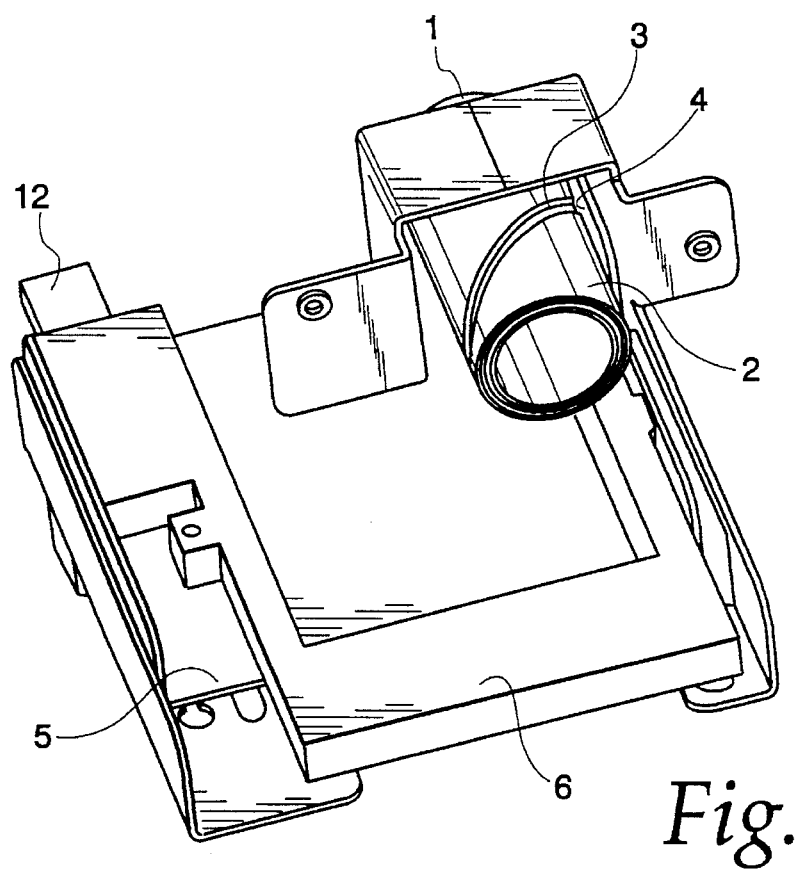
FIG. 2 shows a perspective view of the device from behind.

The figures show one embodiment of a device, the parts of which are indicated by reference numerals. To a locking mechanism 1 of the device is attached a cylinder 2 provided with a groove 3. A guide pin 4 arranged in the groove 3 moves a sliding mechanism 5, to which is attached a mounting carriage 6, on which a memory or microcircuit unit, such as a PCMCIA memory card, is mounted. The memory card positioned on the mounting carriage 6 is connected electrically in such a way that a microcomputer has an access to read data from the memory card or to write data therein. It is also possible that the mounting carriage 6 brings the memory unit within the reach of specific read and write heads or the like or connects the unit to an electric drive mechanism (not shown). By guiding means 7 and 8, the sliding mechanism 5 is arranged to close or open a lid 11 through guiding arms 9 and 10 at the ends of the lid.

Figure 3:
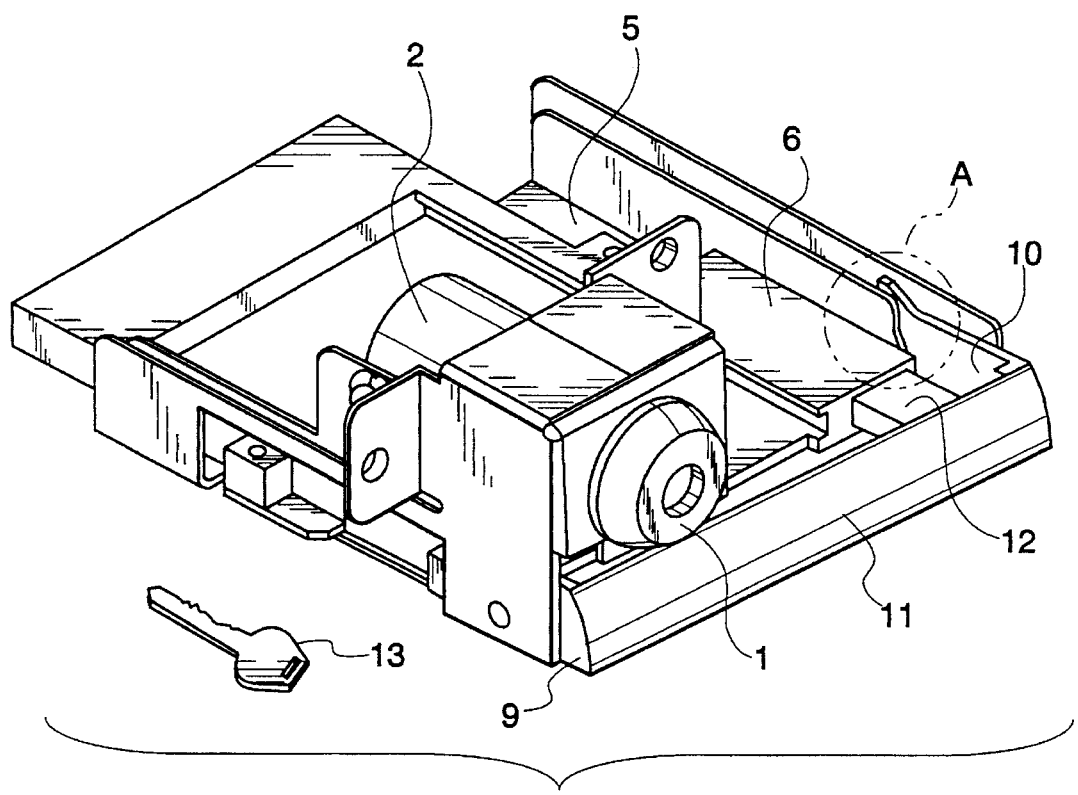
FIG. 3 shows a perspective front view of the device in an ON position.
Figure 4:
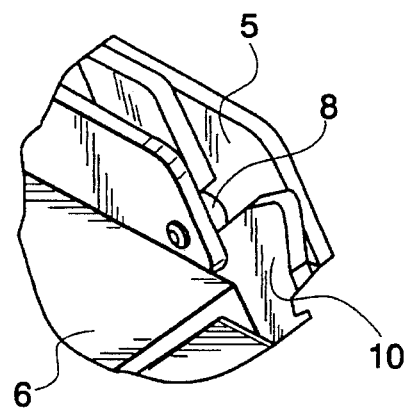
FIG. 4 is a detail drawing of an operating mechanism of a lid at location A of FIG. 3.

FIG. 3 shows the device according to the invention with the lid 11 in an ON position. When a key 13 is turned to an OFF position in the locking mechanism 1, the cylinder 2 attached thereto makes a rotation, due to which the guide pin 4 in the groove 3 of the cylinder takes the sliding mechanism 5 provided with the mounting carriage 6 mechanically outwards through the opening lid. The lid opens to the OFF position shown in FIG. 1 when the guiding means 7 and 8 of the sliding mechanism 5 push the guiding arms 9 and 10 of the lid. At the same time, the mounting carriage slides to a better working position. By means of a release button 12 at the mounting carriage 6, the memory or microcircuit unit can be detached from the carriage and replaced by another one.

When the key is turned to the ON position in the locking mechanism 1, the lid 11 closes, pulled at its guiding arms 9 and 10 by the guiding means 7 and 8, back to the ON position of FIG. 3. Simultaneously, the mounting carriage 6 withdraws into the device, pulled by the guide pin 4 moving in the groove 3, and takes a possible memory or microcircuit unit to its place.

The protective device according to the invention may be adapted to operate with any format of memory or microcircuit unit, such as a 3½" diskette, a PCMCIA card or a hard disk. Necessary read, write etc. devices as well as the mounting carriage are adapted to operate with the format of the storage unit used at each time.

The invention is not restricted to the attached embodiment or to be used in ADP equipments only, but it may be applied in places where big amounts of data are processed.

The displacing mechanisms of the invention set forth above are mechanical, but they, as well as the other embodiments, may be modified in many ways within the inventive idea defined in the attached claims.

I claim:

1. A protective device for protecting a memory or microcircuit unit, the protective device comprising:

a mounting place for receiving the memory or microcircuit unit;

a locking mechanism having an OFF position and an ON position;

a protective lid pivotably attached to the locking mechanism, the lid being turnable to protect the memory or microcircuit unit positioned in the mounting place when the locking mechanism of the protective device is in the ON position a cylinder having a groove, the cylinder being rigidly connected to the locking mechanism;

a sliding mechanism comprising a mounting carriage for receiving the memory or microcircuit unit; and a guide pin arranged in the groove for moving the sliding mechanism.

2. A protective device according to claim 1, wherein the memory or microcircuit unit further comprises a release button protected behind the turnable lid.

3. A protective device according to claim 1, comprising an adapter, by which the protective device may be attached to a mounting place of an apparatus or machine using the protective device.

4. A protective device according to claim 1, wherein the protective lid is provided with guiding arms and the sliding mechanism is provided with guiding means communicating with the guiding arms of the protective lid for opening and closing the protective lid.

5. A protective device according to claim 4, wherein with the locking mechanism in the OFF position, the sliding mechanism is slid out by means of the guide pin to receive or deliver the memory or microcircuit unit and the protective lid is opened when the guiding means push the guiding arms and, with the locking mechanism in the ON position, the lid is closed when the guiding means pull the guiding arms and the mounting carriage is withdrawn into the device, pulled by the guide pin.

6. A protective device according to claim 1, wherein a key moves the locking mechanism between the OFF position and the ON position, such that when the key is removed from the locking mechanism with the lid in the protective position, the memory or microcircuit unit cannot be removed from the mounting place.

7. A protective device according to claim 1, wherein the protective device is mounted fixedly to an apparatus or a machine using the protective device.

* * * * *